Dec. 8, 1964 A. Y. MIDLASH 3,160,888

SYNCHRONIZED MOTION PICTURE AND SOUND RECORDING SYSTEM AND DRIVE MECHANISM THEREFOR

Filed July 7, 1961 2 Sheets-Sheet 1

Inventor.
Arnold Y. Midlash.
By. Wilson & Geppert
Attorneys.

Inventor.
Arnold Y. Midlash
By. Wilson & Geppert
Attorneys.

United States Patent Office 3,160,888

Patented Dec. 8, 1964

3,160,888

SYNCHRONIZED MOTION PICTURE AND SOUND RECORDING SYSTEM AND DRIVE MECHANISM THEREFOR

Arnold Y. Midlash, Chicago, Ill.
(800 Meadowlark Lane, Glenview, Ill.)

Filed July 7, 1961, Ser. No. 122,537
9 Claims. (Cl. 352—15)

The present invention relates to a means to synchronize sound recordings with motion picture film and more specifically to provide a low cost sound synchronization system which can be readily adapted to existing amateur 8 and 16 mm. motion picture projectors and tape recording equipment.

The addition of sound to silent motion pictures for the hobbyist has long been a sought after objective. Several systems or methods have been tried but without much success. Dual phonograph turntables have been utilized to provide musical background, but the operator is constantly changing records or recording bands and switching from one turntable to the other during the showing of the film. Another method contemplates the use of film having a magnetic stripe thereon. This stripe could originally be on the film or attached to existing silent film, and recording done during the shooting of the film or at a later time. This latter system is both costly and time consuming and cannot be utilized by the many millions of silent projectors now in use. A third method is the use of magnetic tape in a tape recorder. Here again the recording can be made simultaneously with the film shooting or at a later time, but the difficult problem of synchronizing the two motors, the motion picture projection and the tape recorder still exists.

Several synchronization techniques have been tried for tape recorders used in conjunction with film projectors. One such system involves the use of identical synchronous motors for the recorder and the projector such that any change in current supply would affect the motors identically. However, in view of tape slippage and tape stretch, synchronization is soon lost and to obviate this perforated magnetic film has been tried. However, a recorder for use with the perforated film is presently only available at the professional level and consequently is very expensive. Other methods in an attempt to perfect synchronization between the record and the projector include the use of a stroboscope or a rheostat to control the speed of the recorder motor by the variation in speed of the projector motor. Too few of the older projectors permit variation of motor speed.

The present invention relates to a relatively simple synchronized sound system that is within the reach of the amateur hobbyist and can be adapted to presently owned or readily available equipment. The drive means for this system is the motor of a conventional motion picture projector such as that owned by the hobbyist or readily available at a reasonable price. A commercially available tape recorder can be adapted for the present system or a recording unit without a drive motor can be inexpensively constructed.

An important object, therefore, of the present invention is the provision of a synchronized sound recording system for the amateur motion picture hobbyist. This system permits the motion picture enthusiast to record narration and musical accompaniment to any and all films, regardless of their originally photographed film speeds. It is also possible to produce films with lip synchronization and to allow independent editing of sound or picture without the interference of both.

Another important object of the present invention is the provision of a sound recording and reproducing unit which is driven by the motor of a motion picture projector. Thus, a person owning or having available a motion picture projector may advance to sound recording and synchronization without buying new and more complicated or expensive equipment. All that is required is a conventional tape recorder which can be inexpensively adapted to the present sound system.

The present invention further comprehends the provision of a novel drive unit for the magnetic tape which may be added to a conventional tape recorder or is an integral element of a motorless tape recorder. Since an expensive component of a quality tape recorder is the drive motor, the use of a drive means outside of the recorder allows an inexpensive tape recorder to be utilized without loss in quality of the sound reproduction.

The present invention also comprehends a novel sound system and drive unit which can utilize quarter inch magnetic tape or film with or without perforations. The presence of 16 mm. sprocket holes would, however, assure precise synchronization.

The drive unit for the magnetic film or tape is directly connected to the drive unit for the motion picture projector. At the accepted silent projection speed of 16 frames per second (f.p.s.), the speed of the magnetic tape or film would be driven at 4.8 inches per second, whether the projector is an 8 or 16 mm. variety. A speed of 16 frames per second will provide 16 revolutions per second of the drive means for either 8 or 16 mm. motion picture film, thus providing a constant speed for the drive unit of the tape recorder. At 4.8 inches per second (i.p.s.) quality sound reproduction will be attainable with relatively inexpensive tape recording-playback equipment.

A further object of the present invention is the provision of a motion picture projection and sound recording system where the exposed motor drive control or threading knob is removed and the exposed shaft is connected to a flexible cable which in turn is connected to the drive means for the magnetic tape or film. The drive means is directly connected to a drive wheel for the tape or magnetic film and to the take-up reel for the tape or magnetic film. The drive wheel is sprocketed for the perforated magnetic film or a rubber roller for a frictional drive for straight magnetic tape is provided.

The present invention also comprehends a novel projection and sound reproducing system where available films may be reduced to 8 mm. along with separate sound tracks so that an individual owning a low cost projector by obtaining an inexpensive magnetic film or tape recorder or converting an existing tape recorder can have sound synchronized motion pictures at low cost. This will provide a wider market for film messages and a new market for existing films.

Further objects are to provide a construction of maximum simplicity, efficiency, economy and ease of assembly and operation, and such further objects, advantages and capabilities as will later more fully appear and are inherently possessed thereby.

Figures 1, 2, 7:
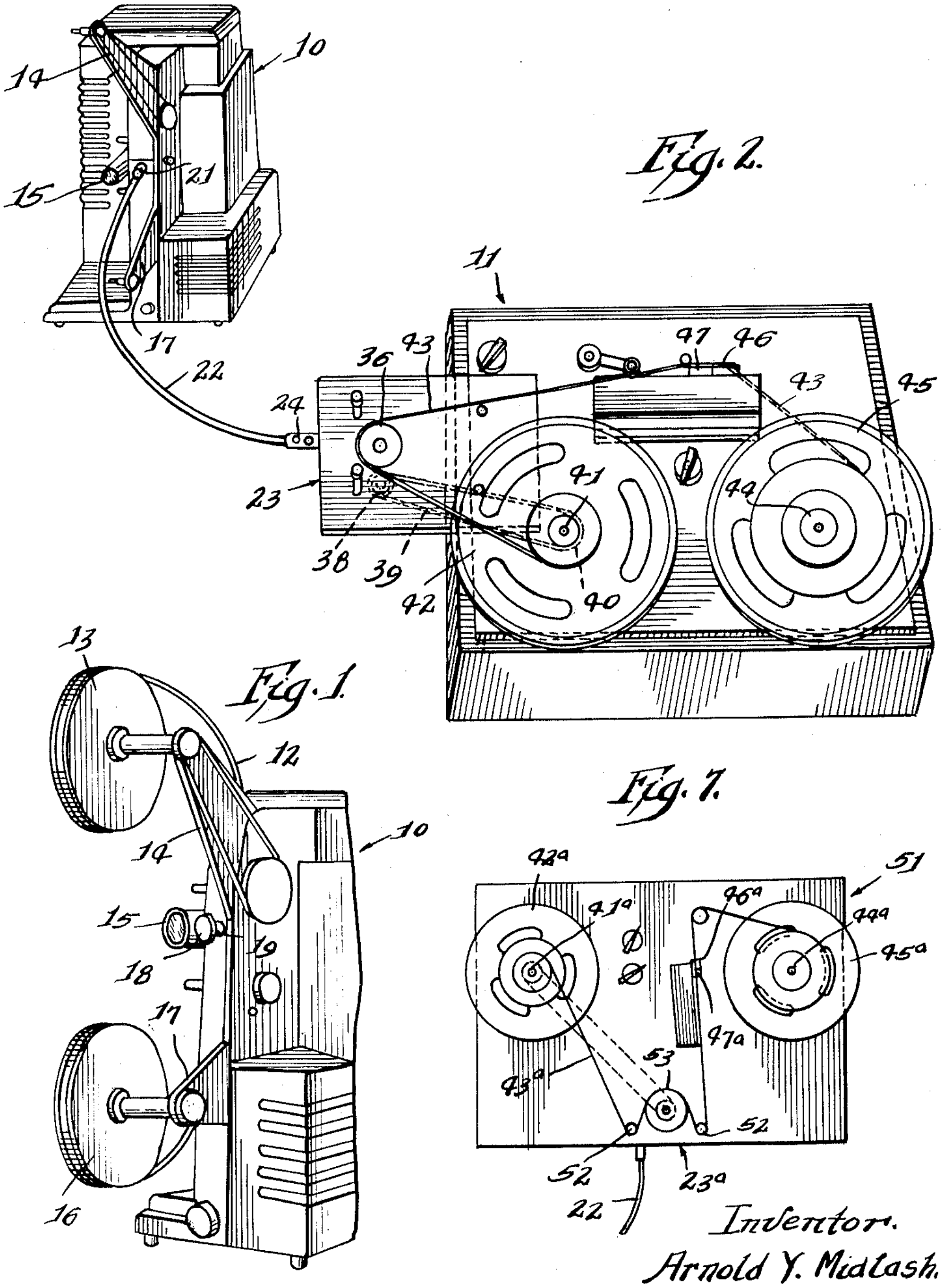
FIGURE 1 is a fragmentary perspective view of a motion picture projector showing an exposed motor drive control or threading knob.
FIG. 2 is a perspective view of a motion picture projector with the reels removed and interconnected with a tape recorder through the novel synchronization drive means.
FIG. 7 is a top plan view of a motorless tape recorder having the novel drive means as an integral part thereof.
Figure 3:
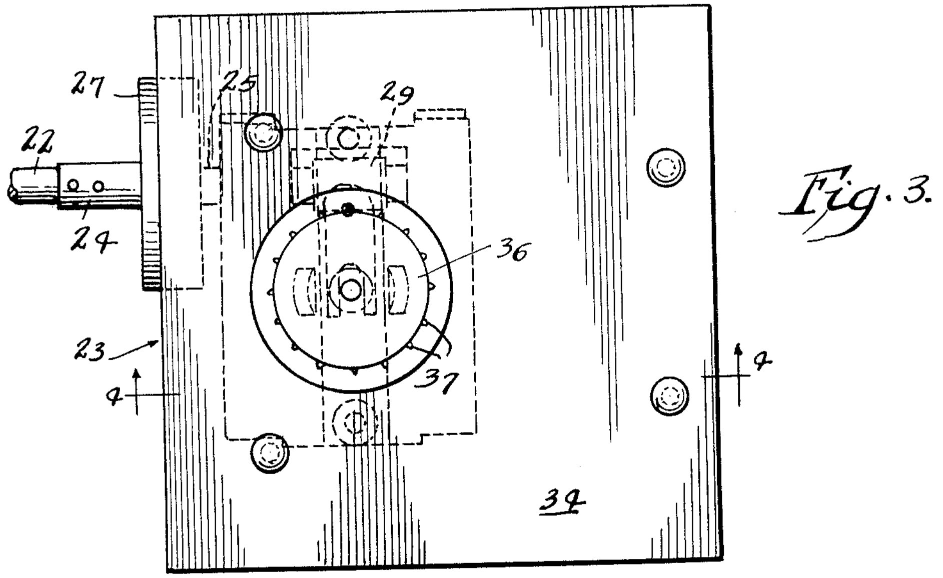
FIG. 3 is a top plan view of the novel drive unit adapted to be attached to a conventional tape recorder.

Referring more particularly to the disclosure in the drawings and to the novel illustartive embodiments therein shown, the present invention is shown in FIGS. 1 and 2 for use on a conventional silent motion picture projector 10 and a conventional tape recorder 11. The motion picture projector includes an intermittent feed mechanism to feed the motion picture film 12 from a supply reel 13 on the upper support arm 14 past a projection lens 15 to a driven take-up reel 16 on a lower support arm 17. The take-up reel 16 as well as other components of the projector, such as the intermittent feed device and the shutter mechanism of the projector, is driven in a manner entirely conventional in projectors of this type by a suitable motor and related interconnecting drive mechanism. The film 12 is threaded over suitable idler rollers and feed sprockets which transport the film while permitting an essential amount of slack as is conventional in silent projectors and not illustrated.

A substantial number of silent projectors available to the hobbyist have an exposed motor drive control or threading knob 18 on a shaft 19 or, if the drive control is not exposed, it is accessible behind a removable cover plate. Each full revolution of the knob and its shaft 19 advances one frame of the motion picture film 12. A silent projector passes 16 frames per second while a sound projector passes 24 frames per second. These speeds are the same whether 8 mm. or 16 mm. film is used; and in the present invention the silent projection speed of 16 frames per second or 16 revolutions per second of the drive control shaft is utilized although suitable adjustments can be made for the sound projection speed.

This invention harnesses the torque of the motion picture projector 10 at the drive control shaft 19 which is the most accessible location and where the variations of the manufacturer and considerations of cost provide the least variation. The conventional threading knob 18 of FIG. 1 is removed from the shaft 19 and a collar 21 is secured thereto as in FIG. 2. Also secured within the collar 21 is one end of a flexible drive shaft or cable 22 having a length preferably within the range of approximately 10 to 13 inches to provide optimum flexibility without introducing any undesirable characteristics of the cable itself, and is of the type frequently used for automobile speedometers and the like. The length of the cable should be sufficient to allow for a right angle bend so the sound recording equipment will be at one side and not directly in front of the projector and possibly block the projection of the filmed image.

Figures 4, 5, 6:
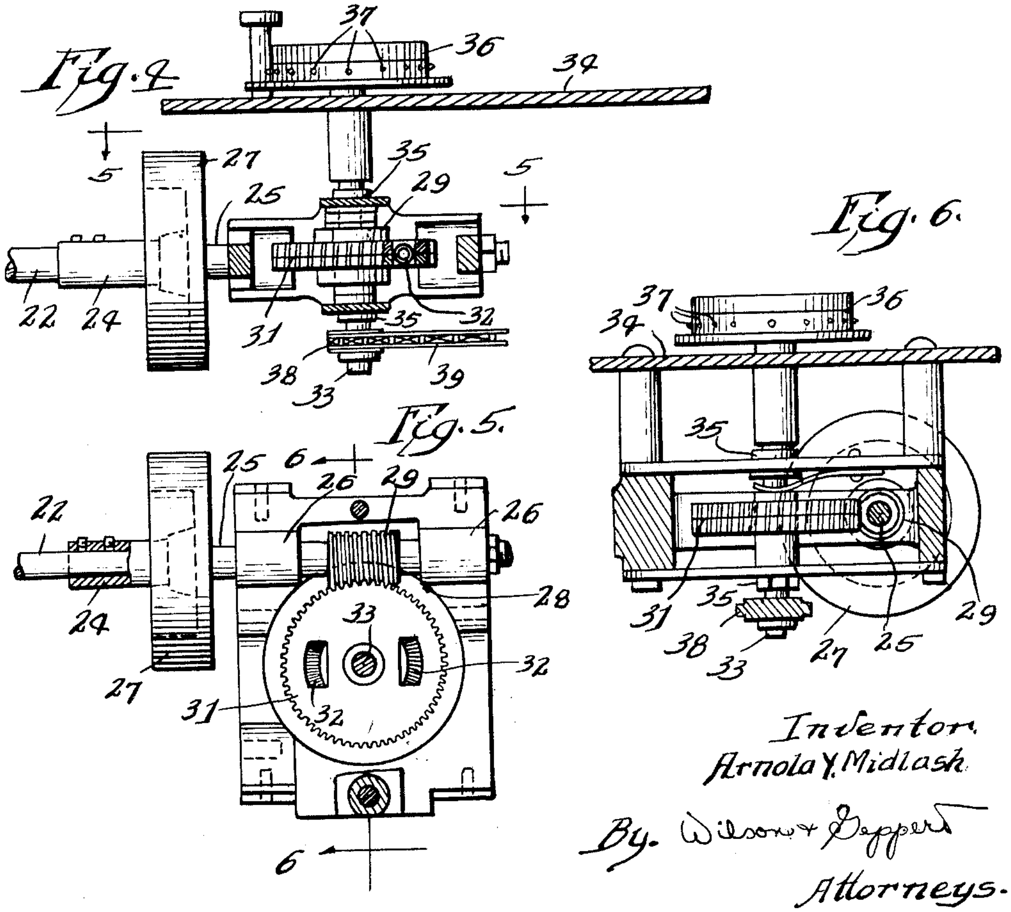
FIG. 4 is a cross-sectional view taken on the line 4—4 of FIG. 3 to more fully show the drive mechanism.
FIG. 5 is a cross-sectional view taken on the line 5—5 of FIG. 4 and viewed in the direction of the arrows.
FIG. 6 is a further cross-sectional view taken on the line 6—6 of FIG. 5.

The opposite end of the cable 22 is inserted into a drive mechanism 23 which is attached to an existing conventional tape recorder 11 (FIG. 2), with the cable 22 secured to a coupling 24 which in turn is secured to a drive shaft 25 (FIGS. 4 and 5) journalled in bearings 26. A stabilizing fly wheel 27 is mounted onto the shaft 25 to limit variations and intermittence created in the motion picture projector drive mechanism. Also secured to the shaft 25 is a 16 to 1 reduction gearing 28 including a worm gear 29 engaging a split gear 31 having spring means 32 to retain the split gear assembled and provide for a positive engagement of the gear 31 with the worm gear 29. This reduction gearing provides a positive driving force for a vertical driven shaft 33 extending through and secured to the split gear 31 and projecting through a mounting plate 34 affixed by any suitable means to the tape recorder 11.

The shaft 33 (FIGS. 4 and 6) which is journalled in bearings 35 makes one revolution for each 16 revolutions of the flexible shaft or cable 22. A sprocket wheel 36 is secured to the upper end of the shaft 33 above the plate 34 and has 16 driving sprockets 37 equally spaced on its circumference. On the opposite end of the shaft 33 is mounted a gear 38 and a chain 39 connects the gear 38 with a gear 40 on the spindle 41 of the tape recorder take-up reel 42 (FIG. 2). This gear and chain drive includes a conventional clutch arrangement to prevent overdrive and subsequent damage to a tape 43.

The tape recorder 11 (FIG. 2) is of conventional design having a feed spindle 44 and a feed reel 45, the take-up spindle 41 for the reel 42, a record-playback head 46 and an erase head 47. The drive capstan is by-passed as the film 43 goes from the record-playback head 46 directly to the sprocket wheel 36 and thence to the take-up reel 42. An example of the tape 43 utilized in this embodiment is ¼ inch oxide film having 16 mm. sprocket holes. The record-playback head 46 and the erase head 47 are of the conventional type for a half track recording. Thus the sprocket holes on one edge of the film do not interfere with the recording track. As the sprockets 37 are equally spaced on the circumference of the sprocket wheel 36 to accommodate the sprocket holes in the tape or film 43, one revolution of the sprocket wheel per second feeds approximately 4.8 inches of tape per second through the tape recorder. This rate of feed will result in increased high fidelity characteristics of sound over a conventional inexpensive tape recorder.

The drive motor for the tape recorder is not utilized for the present invention, but the conventional sound circuitry is retained for sound operation of this invention, the details of the circuitry not being shown as it forms no part of the present invention.

As shown in FIG. 7, the novel drive mechanism $23^a$ may be constructed as an integral part of an inexpensive recording unit 51. This recording unit contains a conventional sound circuit, but does not contain a drive motor as there is no drive capstan. This recorder includes a take-up spindle $41^a$ for a take-up reel $42^a$, a feed spindle $44^a$ for a feed reel $45^a$, a record-playback head $46^a$ and an erase head $47^a$. Idler wheels 52 retain the tape $43^a$ under proper tension as it passes around the drive wheel 53 of the drive mechanism $23^a$. The drive wheel 53 in this embodiment is a rubber roller providing a frictional drive for a conventional quarter inch magnetic tape $43^a$. The external circumference of the drive wheel 53 is approximately 4.8 inches so that the magnetic tape be driven at the same speed as the perforated film. This tape recorder for use with a motion picture projector could be inexpensively produced for or built by the hobbyist.

It is understood that the sprocket wheel is interchangeable with the rubber roller in either the add-on unit for a conventional tape recorder or the new motorless recorder (FIG. 7) depending upon whether 16 mm. perforated or unperforated quarter inch tape is utilized. While the improvement has been shown and described as being advantageously applicable to an 8 mm. silent motion picture projector, it is not my desire or intent to unnecessarily limit the scope or the utility of the improved features of this illustrative embodiment except as recited in the claims.

Having thus disclosed the invention, I claim:

1. A synchronized motion picture and sound recording system comprising a motion picture projector and a tape recorder, a drive motor for the projector, an exposed drive control shaft on the projector, a flexible cable connected at one end to the drive control shaft, a horizontal shaft on said tape recorder connected to the other end of the flexible cable, stabilizing means on said shaft to prevent whip and oscillation of said flexible cable, a vertical shaft in said tape recorder, means including meshing speed reduction gearing on said shafts for rotating the vertical shaft from said horizontal shaft and reducing the revolutions of said vertical shaft relative to said horizontal shaft including a worm gear secured to the horizontal shaft and a spring-loaded split gear engaging the worm gear and secured to the vertical shaft, said tape recorder including a feed spindle and reel and a take-up spindle and reel for magnetic tape running between said reels and means to record and play back the desired sound track, drive means on said vertical shaft for engaging said magnetic tape, and means connecting said vertical shaft with said take-up spindle to simultaneously drive the magnetic tape and the take-up reel.

2. A synchronized motion picture and sound recording system as set forth in claim 1, in which the means to drive the take-up spindle includes a gear secured to the lower end of the vertical shaft, a gear secured to the take-up spindle and a drive connection between the two gears.

3. A synchronized motion picture and sound recording system as set forth in claim 1, in which said drive means is a sprocket wheel adapted to engage and drive perforated magnetic film.

4. A synchronized motion picture and sound recording system as set forth in claim 1, in which said drive means is a rubber friction roller adapted to engage and drive magnetic tape.

5. A drive mechanism to synchronize a magnetic tape on a tape recorder with a motion picture film in a silent motion picture projector with the projector providing the driving force for the tape recorder, comprising a flexible drive shaft adapted to be secured at one end to a drive control shaft on the projector, a horizontal shaft in the tape recorder secured to the opposite end of the flexible shaft, stabilizing means for said flexible shaft, a relatively large drive wheel for the tape recorder, a vertical depending shaft secured to said drive wheel, reduction gearing connecting said vertical and horizontal shafts providing one revolution per second of said drive wheel, and a gear and chain on said vertical shaft synchronizing rotation of a take-up spindle on the tape recorder with said drive wheel.

6. A drive mechanism as set forth in claim 5, in which the circumference of the drive wheel is approximately equal to the length of 16 mm. motion picture film passing through the projector during one second.

7. A drive mechanism as set forth in claim 5, in which said drive wheel makes one revolution for each sixteen revolutions of the flexible cable.

8. A drive mechanism as set forth in claim 5, in which said drive wheel pulls the magnetic tape across sound recording reproducing heads of the tape recorder.

9. A drive mechanism attachment to synchronize a magnetic tape on a conventional tape recorder with a motion picture film in a silent motion picture projector with the projector providing the driving force for the tape recorder, comprising a mounting plate adapted to be secured to the side of a conventional tape recorder, a relatively large drive wheel rotatably mounted on said plate and adapted to pull a magnetic tape across sound recording reproducing heads of the recorder, a depending vertical shaft secured to said drive wheel, means mounting the shaft on the plate, a horizontal shaft rotatably mounted on the plate, reduction gearing connecting said shafts to provide one revolution per second for said drive wheel, a relatively heavy fly-wheel on said horizontal shaft, and a flexible cable secured at one end to said shaft and at its other end to the drive control shaft of the motion picture projector.

References Cited in the file of this patent

UNITED STATES PATENTS

| | | |
|---|---|---|
| 1,841,937 | Byrd | Jan. 19, 1932 |
| 1,866,712 | Jones | July 12, 1932 |

FOREIGN PATENTS

| | | |
|---|---|---|
| 62,655 | France | Feb. 2, 1955 |

OTHER REFERENCES

Cameras, "Motion Pictures With Magnetic Sound," pages 24–27, 46 of PSA Journal, vol. 20, No. 3, March 1954.